United States Patent Office 3,644,289
Patented Feb. 22, 1972

3,644,289
LIGHT SENSITIVE POLYURETHANES PREPARED FROM HYDROXYL CONTAINING POLYMER AND AN ISOCYANATO-STILBENE COMPOUND
Adnan A. R. Sayigh and Fred A. Stuber, New Haven, and Henri Ulrich, North Branford, Conn., assignors to The Upjohn Company, Kalamazoo, Mich.
No Drawing. Filed May 29, 1969, Ser. No. 829,100
Int. Cl. C08g 22/00, 22/22
U.S. Cl. 260—47 CB                                    8 Claims

ABSTRACT OF THE DISCLOSURE

Light-sensitive polyurethanes are prepared by reacting (a) a polymer having a free hydroxyl group in the recurring unit thereof with (b) an isocyanato-stilbene of the formula:

$$\text{(lower-alkoxy)}_n\text{-}\underset{}{\bigcirc}\text{-CH=CH-}\underset{}{\bigcirc}\text{-NCO}$$

wherein $n$ is an integer from 1 to 3. The above polyurethanes undergo cross-linking on exposure to ultraviolet light and, accordingly, can be used in photoresist systems.

BACKGROUND OF THE INVENTION

(1) Field of the invention

This invention relates to novel polyurethanes and is more particularly concerned with polymers having a N-(lower-alkoxyphenyl)carbamoyl substituent in the recurring unit thereof.

(2) Description of the prior art

Although many light sensitive polymers are well-known in the art, the polymers of the invention are, so far as is known, a novel class of polymers.

SUMMARY OF THE INVENTION

The present invention comprises a light-sensitive polyurethane obtained by reacting (i) a polymer having a free hydroxyl group in the recurring unit thereof with (ii) from about 10 to about 100 percent by weight of the amount necessary to react with all the hydroxyl groups in said polymer, of an isocyanato-stilbene having the formula:

$$\text{(lower-alkoxy)}_n\text{-}\underset{}{\bigcirc}\text{-CH=CH-}\underset{}{\bigcirc}\text{-NCO}$$

wherein $n$ is an integer from 1 to 3.

The light sensitive polymers of the invention can be employed in photoresist systems and are accordingly useful in photolithographic and photomechanical processes as will be described and exemplified more fully hereinafter. This invention also comprises (a) photoresist systems which contain a light sensitive polymer defined above and (b) the polymers derived by the photopolymerization of the light-sensitive polymers defined above.

The term "lower-alkoxy" as used herein means alkoxy from 1 to 8 carbon atoms, inclusive, such as methoxy, ethoxy, propoxy, butoxy, pentyloxy, hexyloxy, heptyloxy, octyloxy and the like.

It is to be noted that the starting isocyanato-stilbene can exist in both cis and trans forms. These stereo configurations are retained in the polyurethanes of the invention and it is therefore to be understood that polyurethanes in which the stilbene residues are all in the cis or trans form or in which some of the stilbene residues are in cis and some in trans configuration, are all within the scope of the invention.

DETAILED DESCRIPTION OF THE INVENTION

The polymers (I) having a free hydroxyl group in the recurring unit thereof which are employed in the preparation of the polyurethanes of the invention can have molecular weights from about 1000 all the way up to 1,000,000 or even higher. Illustrative of the polymers (I) are:

(i) Polyvinyl alcohols (PVA). These polymers are well-known in the art, are available in a wide range of molecular weights within the above range, and can be prepared readily by hydrolysis of the corresponding polyvinylacetates; see, for example, Manufacture of Plastics, edited by W. Mayo Smith, Reinhold, New York, 1964, page 256 et seq. The polyvinyl alcohols are characterized by the recurring unit:

$$-\left[\text{CH}_2-\underset{\text{OH}}{\text{CH}}\right]-$$

(ii) Novolac resins. These resins are the products obtained by acid condensation of phenol, or a substituted phenol, with formaldehyde and are conventionally represented by the general formula:

$$\underset{R_4}{\bigcirc}\text{-CH}_2\text{-}\left[\underset{R_4}{\bigcirc}\text{-CH}_2\text{-}\right]_x\underset{R_4}{\bigcirc}$$
(OH groups on each ring)

wherein $x$ has an average value of about 8 to about 12 and $R_4$ represents from 0 to 4 substituents selected from halogen and lower-alkyl groups. It is to be understood that the above formula is highly idealized and is an approximation only; see, for example, Carswell, "Phenoplasts," pages 29 to 35, Interscience, New York, 1947. A wide range of novolac resins of differing molecular weights within the above quoted range is available commercially, all of which are represented approximately by the above formula.

(iii) Phenoxy resins characterized by the following molecular structure:

$$-\left[\text{O-}\underset{}{\bigcirc}\text{-}\underset{R_2}{\overset{R_1}{\text{C}}}\text{-}\underset{}{\bigcirc}\text{-O-}\underset{\text{H}}{\overset{\text{H}}{\text{C}}}\text{-}\underset{\text{OH}}{\overset{\text{H}}{\text{C}}}\text{-}\underset{\text{H}}{\overset{\text{H}}{\text{C}}}\text{-}\right]_y$$

wherein $R_1$ and $R_2$ each represent lower-alkyl. These resins are obtained by reaction of the corresponding bisphenol and epichlorohydrin; see, for example, U.S. Pats. 3,277,051 and 3,401,139. They are available commercially in a molecular weight range of about 15,000 to about 60,000.

(iv) Poly(hydroxydicyclopentadiene)ethers. These polymers are characterized by the following molecular structure:

wherein $z$ has an average value within the range of about 10 to about 14. These resins are available commercially and are prepared by polymerization of the corresponding hydroxydicyclopentadiene oxide of the formula:

The term "lower-alkyl" as used herein means alkyl from 1 to 8 carbon atoms, inclusive, such as methlyl, ethyl, propyl, butyl, pentyl, hexyl, heptyl, octyl, and isomeric forms thereof.

In preparing the light-sensitive polyurethanes (II) of the present invention, the starting polymer (I) is reacted with the appropriate lower-alkoxy-substituted isocyanato-stilbene (III) having the formula:

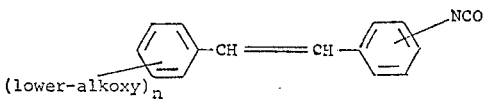

wherein $n$ has the significance hereinbefore defined. The reaction is conducted advantageously in the presence of an inert organic solvent, i.e. an organic solvent which does not enter into reaction with either of the reactants or otherwise interfere with the desired course of the reaction. Examples of inert organic solvents are benzene, toluene, xylene, tetrahydronaphthalene, decahydronaphthalene, chlorobenzene, dichlorobenzene, tetrahydrofuran, dioxane, dimethylsulfoxide, diethylene glycol dimethyl ether, diethyl ether, N,N-dimethylformamide, hexamethylphosphoramide, ethyl acetate, Cellosolve acetate and the like.

The reaction is preferably conducted at elevated temperatures, i.e. at a temperature within the range of about 50° C. to about 200° C., but lower temperatures, of the order of about 25° C. can be employed if speed of reaction is not a critical consideration.

The reaction between the isocyanato-stilbene (III) and the hydroxyl group containing polymer (I) is advantageously carried out in the presence of a catalyst. Any of the catalysts which are known in the art to be useful in the catalysis of reaction between an isocyanato group and a hydroxyl group can be used for this purpose; see, for example, Saunders et al., Polyurethanes, Chemistry and Technology, part I, pages 228 to 230, Interscience Publishers, New York, 1964; see also Burkus, Journal Organic Chemistry 26, pages 779 to 782, 1961. Such catalysts include organic and inorganic salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, zirconium, as well as phosphines and organic tertiary amines. Representative organotin catalysts are stannous octoate, stannous oleate, dibutyltin dioctoate, dibutyltin dilaurate, and the like. Representative organic amines catalysts are triethylamine,
triethylenediamine,
N,N,N',N'-tetraethylethylenediamine,
N,N,N',N'-tetramethylethylenediamine,
N-methylmorpholine,
N-ethylmorpholine,
N,N,N',N'-tetramethylguanidine,
N,N,N',N'-tetramethyl-1,3-butanediamine,
N,N-dimethylethanolamine,
N,N-diethylethanolamine,
and the like.

The reaction which occurs between the isocyanatostilbene (III) and a single hydroxyl of the polymer (I) can be represented schematically as follows:

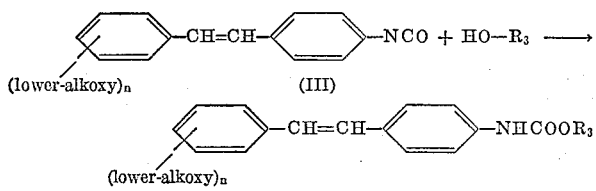

wherein $R_3$ represents the residue of the polymer (I) and $n$ is as hereinbefore defined.

In order that all the hydroxyl groups in the starting polymer (I) shall be converted to urethane groups as illustrated above, it is necessary to employ an amount of the isocyanatostilbene (III) which is at least stoichiometric with respect to polymer (I), i.e. the isocyanatostilbene (III) is employed in an amount corresponding to at least A moles per mole of polymer (I) wherein A is the number of free hydroxyl groups in the polymer (I). If desired, however, the polymer (I) can be reacted with less than the stoichiometric proportion of the isocyanatostilbene (III) whereby there is obtained a light-sensitive polymer which contains some urethane groups, produced by reaction illustrated above, and some free unconverted hydroxyl groups. Thus, as little as one-tenth of the stoichiometric amount of isocyanatostilbene (III) can be employed whereby only 10 percent of the free hydroxyl groups in the polymer (I) will be converted to urethane groups. The resulting partially converted polymer still exhibits useful light sensitive properties but is less efficient, in the photoresist systems to be described hereinafter, than the more fully or wholly converted polymers obtained using greater proportions of isocyanatostilbene (III) to hydroxyl polymer (I).

In carrying out the condensation of isocyanatostilbene (III) and polymer (I), the progress of the reaction can be followed readily by routine analytical procedures such as infrared spectroscopy; e.g. disappearance of the infrared band corresponding to the isocyanato group clearly marks the end of the reaction. When the reaction is determined to be complete, the light-sensitive polymer (II) so produced is isolated by conventional procedures, for example, by addition of a solvent such as methanol, ethanol, carbon tetrachloride, hexane, and the like, in which the polymer (II) is insoluble. The light-sensitive polymer (II) so obtained can then be purified, if desired, by routine procedures such as by chromatography, solvent extraction followed by precipitation, and the like.

In general, the light-sensitive polymers (II) of the invention are resinous solids having a molecular weight within the range of about 2,000 to about 3,000,00 depending upon the molecular weight of the starting polymer and the proportion of isocyanatostilbene reacted therewith. Said polymers are soluble in polar solvents such as tetrahydrofuran, acetone, Cellosolve, and the like, from which they can be cast as films as will be described in more detail hereinafter.

The isocyanatostilbenes (III) which are employed as starting materials in the process described above can be prepared by phosgenation of the corresponding aminostilbenes (IV) using phosgenation conditions routinely employed in the preparation of aromatic isocyanates. Such procedures are described, for example, by Siefken, Annalen, 562, 75 et seq., 1949. The aminostilbenes (IV) which are employed to prepare the isocyanatostilbenes (III) can be prepared from the corresponding nitrostilbenes using reaction conditions conventional in the art for the reduction of aromatic nitro compounds without simultaneous reduction of the olefinic double bond present in the molecule. Illustrative of said reduction conditions are the use of (a) stannous chloride in the presence of hydrochloric acid under conditions described, for example, by Peck et al., Journal American Chemical Society 74, 468, 1952, for the reduction of 4-dimethylamino-4'-nitrostilbene to 4-dimethylamino-4'-aminostilbene, (b) aqueous ferrous sulfate in the presence of ammonium hydroxide, (c) Raney nickel, (d) titanous chloride or titanous sulfate in the presence of hydrochloric or sulfuric acid, respectively, and (e) metallic tin, zinc, or iron in the presence of hydrochloric acid.

The nitrostilbenes which are employed in the preparation of the ambinostilbenes (IV) using the above reduction procedures can be represented by the formula:

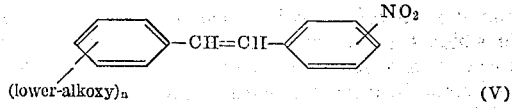

wherein lower-alkoxy and $n$ are as hereinbefore defined. The nitrostilbenes (V) can exist in both cis- and trans-forms as well as mixtures thereof, and, upon reduction, give rise to the corresponding aminostilbenes (IV) in cis- or trans-forms or mixtures thereof.

The nitrostilbenes (V) can themselves be prepared by conventional procedures. For example, the nitrostilbenes (V) can be prepared by condensing the corresponding lower-alkoxybenzaldehyde with the appropriate 2-, 3- or 4-nitrotoluene or the appropriate 2-, 3- or 4- nitrophenylacetic acid. Said condensation is generally carried out in the presence of a catalyst such as secondary amine, for example, piperidine. The condensation of the appropriate lower-alkoxybenzaldehyde and the nitrotoluene can be carried out illustratively under the conditions described by Peck et al., supra. The condensation of the appropriate lower-alkoxybenzaldehyde and the nitrophenylacetic acid generally occurs with intermediate formation of the corresponding cinnamic acid of the formula:

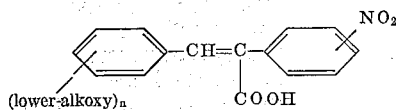

where lower-alkoxy and $n$ have the significance hereinbefore defined. Said cinnamic acid can be isolated and subsequently decarboxylated in situ by carrying out the final stages of the condensation of aldehyde and nitrophenylacetic acid at temperatures above that at which decarboxylation commences. Typical of the latter procedures is that described by Kaufman, Berichte, 54, 795, 1921. Where piperidine is employed as catalyst, this latter procedure generally gives rise exclusively to the trans-isomer of the desired nitrostilbene (V). The method in which the intermediate cinnamic acid is isolated prior to decarboxylation has the advantage that it enables either the cis- or trans-isomer of the desired nitrostilbene (V) to be isolated by suitable choice of decarboxylation conditions. As shown by Ulrich et al., Journal Organic Chemistry 31, 4146, 1966, decarboxylation of the above cinnamic acid by heating in inert organic solvents such as benzene, toluene, and the like, in the presence of piperidine or morpholine gives rise to the trans-isomer of the nitrostilbene (V). Decarboxylation of the above cinnamic acid in the presence of copper chromite in quinoline solution yields the cis-isomer of the corresponding nitrostilbene (V).

The lower-alkoxybenzaldehydes, nitrotoluenes and nitrophenylactic acids employed as described above to prepare the nitrostilbenes (V) can be prepared by general procedures well-recognized in the art. Illustratively, methods for the preparation of the alkoxybenzaldehydes, nitrotoluenes, and nitrophenylacetic acids are summarized at pages 507 et seq., pages 135 et seq., and pages 593 et seq., respectively, of Chemistry of Carbon Compounds, edited by E. H. Rodd, volume IIIA, Elsevier, New York, 1954.

The preparation of the isocyanatostilbenes (III), employed as starting materials in the process of the invention, is further illustrated and exemplified by Preparations 1–5 set forth hereinafter.

The novel light-sensitive polymers (I) of the invention undergo further polymerization on exposure to radiation of a wavelength within the range of about 200 to 410 mm. This property of the novel polymers I of the invention renders them particularly useful in the preparation of photoresist systems. For example, the polymers (I) of the invention can be employed in the photographic reproduction and printing arts to produce printing masters as follows.

The polymer (I) of the invention is dissolved in polar solvents such as tetrahydrofuran, acetone, ethyl acetate, Cellosolve, and the like, and is cast as a film on an appropriate substrate such as paper, metal, and like film supports normally employed in the reproduction art. A negative of the image to be reproduced, e.g. lined, screened, or half tone negatives or diapositives, is interposed between the supported film so obtained and a source capable of producing radiation within the wavelengths set forth above. The light-sensitive polymer (I) in those portions of the supported film which receive the radiation is cross-linked by the action of the radiation and is thereby rendered insoluble. The amount of cross-linking produced at any given area of the supported film is directly related to the amount of radiation received thereat. After exposure of the supported film to the radiation, the polymer (I), which has not received radiation and has accordingly not been crosslinked, is dissolved out by means of a solvent, leaving the cross-linked, insoluble, polymer on the surface of the film support in the form of a positive image corresponding to the negative used in the irradiation step. Said image is resistant to solvents, acids, alkalies, water, etc., as well as to abrasion, mechanical stresses, and the like, and hence possesses obvious advantages over images prepared by hitherto conventional reproduction processes.

In a similar manner the photoresist systems produced from the light-sensitive polymers (I) of the invention can be used in other photoresist applications such as in the printing of microcircuitry and related applications which involve production of an image, in the form of insoluble polymer, on a metal substrate such as copper, followed by removal, in part or in toto, of the uncoated metal by etching. Essentially the same technique as that described above is employed in the formation of the insoluble polymer image on the substrate.

The following preparations and examples describe the manner and process of making and using the invention and set forth the best mode contemplated by the inventors of carrying out the invention but are not to be construed as limiting.

PREPARATION 1

(A) Trans-2,5-dimethoxy-4'-aminostilbene

A solution of 70 g. of ferrous sulfate in 100 ml. of water was heated to the boiling point and stirred while a total of 100 ml. of aqueous 58 percent ammonium hydroxide and a solution of 5 g. of trans-2,5-dimethoxy-4'-nitrostilbene (Ulrich et al., supra) in 200 ml. of methanol were added simultaneously, as separate streams, over a period of 15 minutes. After the addition was complete, the resulting dark solution was heated with stirring at 65° C. to 70° C. for a further 2 hours. The product so obtained was heated on a steam bath to remove methanol and ammonia and the residue was extracted with four portions, each of 100 ml. of ether. The ethereal extracts were combined, washed with water, and dried over anhydrous magnesium sulfate. The dried solution was filtered and the filtrate was evaporated to dryness. The residue (3 g.: M.P. 89 to 91° C.) was recrystallized from ethanol to give trans-2,5 - dimethoxy - 4'-aminostilbene in the form of a yellow crystalline solid having a melting point of 91° C. to 92° C. The infrared spectrum of this meterial (CHCl₃ solution) exhibited maxima at 2.75 and 2.95$\mu$ (—NH₂ stretching vibration), 6.18$\mu$ (C=C stretching vibration), and 10.35$\mu$ (=CH out of plane deformation).

Using the above procedure, but replacing trans-2,5-dimethoxy-4-'-nitrostilbene by the corresponding cis-isomer (Ulrich et al., supra), there is obtained cis-2,5-dimethoxy-4'-aminostilbene.

(B) Trans-2,5-dimethoxy-4'-isocyanatostilbene

A total of 1800 ml. of phosgene was bubbled into 2800 ml. of chlorobenzene maintained at 3° C. to 5° C. The resulting solution was maintained at 0° C. to 2° C. with stirring while a solution of 10.0 g. of trans-2,5-dimethoxy-4'-aminostilbene (prepared as described above) in 75 ml. of chlorobenzene was added dropwise over a period of 15 minutes. When the addition was complete, the resulting mixture was heated at 90° C. to 95° C. for 1.5 hours. Infrared spectroscopic analysis of an aliquot of the resulting solution indicated the absence of —NH— and the appearance of a strong band for —NCO. The resulting solution was purged with nitrogen while heating at 60° C. to 70° C. for 2 hours to remove excess phosgene. The purged solution was distilled under reduced pressure to remove chlorobenzene. The residue was treated with ligroin and the yellow solid which separated was isolated by filtration, washed with ligroin and dried. There was thus obtained 10.1 g. of trans-2,5-dimethoxy-4'-isocyanatostilbene in the form of a yellow crystalline solid having a melting point of 68° C. to 70° C. Two grams of this material was dissolved in 15 ml. of hot ligroin-benzene (9:1 v./v.) and the solution separated from a small insoluble sticky residue. Upon cooling of the filtrate there separated 1.5 g. (75 percent recovery) of yellow needles having a melting point of 69.5 to 70.5° C. The infrared spectrum of this material (CCl$_4$ solution) exhibited maxima at 4.5$\mu$ (C=C=O stretching vibration), 6.12$\mu$ (C=C stretching vibration), and 10.35$\mu$ (=CH out of plane deformation).

Using the procedures set forth above, but replacing trans - 2,5 - dimethoxy - 4' - isocyanatostilbene by cis-2,5, - dimethoxy - 4' - isocyanatostilbene (prepared as described in Example 1), there was obtained cis - 2,5-dimethoxy-4'-isocyanatostilbene.

PREPARATION 2

(A) *Cis-3,4,5-trimethoxy-4'-nitrostilbene*

Following the procedure described by Ulrich et al., supra, for the preparation of cis - 2,5 - dimethoxy - 4'-nitrostilbene, but replacing 2,5 - dimethoxybenzaldehyde by 3,4,5 - trimethoxybenzaldehyde, there is obtained cis-3,4,5-trimethoxy-4'-nitrostilbene.

(B) *Cis-3,4,5-trimethoxy-4'-aminostilbene*

Using the procedure described in Preparation 1, part A, but replacing trans - 2,5 - dimethoxy - 4' - nitrostilbene by cis - 3,4,5 - trimethoxy - 4' - nitrostilbene, there is obtained cis-3,4,5-trimethoxy-4'-aminostilbene.

Similarly, using the procedure described by Ulrich et al., supra, for the preparation of cis - 2,5 - dimethoxy - 4'-nitrostilbene, but replacing 2,5 - dimethoxybenzaldehyde by 4-butoxybenzaldehyde,
2-butoxy-3-ethoxybenzaldehyde,
2,3-diethoxybenzaldehyde,
3,4-diisopropoxybenzaldehyde,
3,4-dimethoxybenzaldehyde,
4-ethoxy-2,6-dimethoxybenzaldehyde,
3-ethoxy-2-hexyloxybenzaldehyde,
3-ethoxy-2-pentyloxybenzaldehyde,
2-isobutoxy-3-methoxybenzaldehyde,
5-nitro-2-pentyloxybenzaldehyde, or
2,4,6-trimethoxybenzaldehyde, there are obtained:

cis-4-butoxy-4'-nitrostilbene,
cis-2-butoxy-3-ethoxy-4'-nitrostilbene,
cis-2,3-diethoxy-4'-nitrostilbene,
cis-3,4-diisopropoxy-4'-nitrostilbene,
cis-3,4-dimethoxy-4'-nitrostilbene,
cis-4-ethoxy-2,6-dimethoxy-4'-nitrostilbene,
cis-3-ethoxy-2-hexyloxy-4'-nitrostilbene,
cis-3-ethoxy-2-pentyloxy-4'-nitrostilbene,
cis-2-isobutoxy-3-methoxy-4'-nitrostilbene, and
cis-2,4,6-trimethoxy-4'-nitrostilbene, respectively.

The latter nitro compounds are then reduced, using the procedure described in Preparation 1, part A, to the corresponding amines, namely:

cis-4-butoxy-4'-aminostilbene,
cis-2-butoxy-3-ethoxy-4'-aminostilbene,
cis-2,3-diethoxy-4'-aminostilbene,
cis-3,4-diisopropoxy-4'-aminostilbene,
cis-3,4-dimethoxy-4'-aminostilbene,
cis-4-ethoxy-2,6-dimethoxy-4'-aminostilbene,
cis-3-ethoxy-2-hexyloxy-4'-aminostilbene,
cis-3-ethoxy-2-pentyloxy-4'-aminostilbene,
cis-2-isobutoxy-3-methoxy-4'-aminostilbene, and
cis-2,4,6-trimethoxy-4'-aminostilbene.

(C) *Cis-3,4,5-trimethoxy-4'-isocyanatostilbene*

Using the procedure described in Preparation 1, part B, but replacing trans - 2,5 - dimethoxy - 4' - aminostilbene by cis - 3,4,5 - trimethoxy - 4' - aminostilbene, there is obtained cis-3,4,5-trimethoxy-4'-isocyanotostilbene.

Similarly, using the procedure described in Preparation 1, part B, but replacing trans - 2,5 - dimethoxy-4'-aminostilbene by any of the amines listed in Preparation 2, part B, above there are obtained the corresponding isocyanates, namely:

cis-4-butoxy-4'-isocyanatostilbene,
cis-2-butoxy-3-ethoxy-4'-isocyanatostilbene,
cis-2,3-diethoxy-4'-isocyanatostilbene,
cis-3,4-diisopropoxy-4'-isocyanatostilbene,
cis-3,4-dimethoxy-4'-isocyanatostilbene,
cis-4-ethoxy-2,6-dimethoxy-4'-isocyanatostilbene,
cis-3-ethoxy-2-hexyloxy-4'-isocyanatostilbene,
cis-3-ethoxy-2-pentyloxy-4'-isocyanatostilbene,
cis-2-isobutoxy-3-methoxy-4'-isocyanatostilbene, and
cis-2,4,6-trimethoxy-4'-isocyanatostilbene.

PREPARATION 3

(A) *Cis- and trans-2,5-dimethoxy-3'-nitrostilbene*

Using the procedure described by Ulrich et al., supra, for the preparation of both cis- and trans - 2,5 - dimethoxy-4'-nitrostilbene, but replacing the 4-nitrophenylacetic acid used as starting material by 3-nitrophenylacetic acid, there are obtained the cis- and trans-isomers of 2,5-dimethoxy-3'-nitrostilbene.

(B) *Cis and trans-2,5-dimethoxy-3'-aminostilbene*

Using the procedure described in Preparation 1, part A, but replacing the trans - 2,5 - dimethoxy - 4' - nitrostilbene by the cis- and trans-isomers of 2,5 - dimethoxy - 3' - nitrostilbene, there are obtained the cis- and trans-isomers of 2,5-dimethoxy-3'-aminostilbene.

(C) *Cis- and trans-2,5-dimethoxy-3'-isocyanatostilbene*

Using the procedure described in Preparation 1, part A, but replacing trans - 2,5 - dimethoxy - 4' - aminostilbene by the cis- and trans-isomers of 2,5 - dimethoxy - 3'-aminostilbene, there are obtained the cis- and trans-isomers of 2,5-dimethoxy-3'-isocyanatostilbene.

PREPARATION 4

(A) *trans-2-methoxy-4'-nitrostilbene*

A mixture of 10.0 g. (0.073 mole) of o-methoxybenzaldehyde, 13.3 g. (0.073 mole) of p-nitrophenylacetic acid, 1.4 ml. of piperidine and 100 ml. of chlorobenzene was heated under reflux for 3 hours. At the end of this time the chlorobenzene was removed by distillation under reduced pressure. To the residue was added 50 ml. of piperidine and the resulting mixture was heated under reflux for one hour. At the end of this time the piperidine was removed by distillation under reduced pressure and the residue was treated with 50 ml. of ethanol. The yellow solid which separated was isolated by filtration, washed with ethanol and dried. There was thus obtained 9.0 g. of trans - 2 - methoxy - 4' - nitrostilbene in the form of a yellow solid having a melting point of 122° C.

(B) *Trans-2-methoxy-4'-aminostilbene*

A solution of 6 g. of trans - 2 - methoxy - 4' - nitrostilbene in 300 ml. of methanol was hydrogenated in the presence of 1 g. of Raney nickel. The initial pressure of hydrogen was 50 p.s.i. Hydrogenation was complete in 6 hours. At the end of this time the catalyst was removed by filtration and the filtrate was evaporated to dryness to leave 4.95 g. of trans-2-methoxy-4'-aminostilbene. A portion of this material was converted to the corresponding N-acetyl derivative, melting point 135° C. to 137° C., by treatment with excess acetic anhydride followed by addition of the reaction mixture to water.

Using the procedure described by Ulrich et al., supra, 2-methoxybenzaldehyde is condensed with 4-nitrophenyl acetic acid to obtain cis-2-methoxy-4'-nitrostilbene which is then hydrogenated using the procedure described in Preparation 4, part B, to obtain cis-2-methoxy-4'-aminostilbene.

(C) *Trans-2-methoxy-4'-isocyanatostilbene*

A total of 1000 ml. of phosgene was passed into 200 ml. of chlorobenzene maintained at 0° C. to 2° C. To the resulting mixture was added, over a period of 12 minutes, a solution of 6 g. of trans-2-methoxy-4'-aminostilbene in 100 ml. of chlorobenzene. The temperature of the reaction mixture was maintained between 1° C. and 4° C. during the addition. After the addition was complete the mixture was heated at 90° C. to 95° C. for 1.5 hours and thereafter was purged of phosgene by passage of nitrogen for 1.5 hours. The resulting purged mixture was filtered and evaporated to dryness under reduced pressure. The yellow crystalline residue which remained was washed with ligroin, isolated by filtration and dried. There was thus obtained trans-2-methoxy-4'-isocyanatostilbene in the form of a light brown liquid.

Similarly, using the above phosgenation procedure, but replacing trans-2-methoxy-4'-aminostilbene by cis-2-methoxy-4'-aminostilbene, there is obtained cis-2-methoxy-4'-isocyanatostilbene.

PREPARATION 5

(A) *Trans-4-methoxy-4'-nitrostilbene*

A mixture of 10 g. (0.073 mole) of p-methoxybenzaldehyde, 13.3 g. (0.073 mole) of p-nitrophenylacetic acid and 1.4 ml. of piperidine in 100 ml. of chlorobenzene was heated under reflux for 4 hours using a water trap. At the end of this time the solvent was removed by distillation under reduced pressure. The yellow solid which separated was isolated by filtration, washed with ethanol and dried. There was thus obtained 12 g. of trans-4-nitro-4'-methoxystilbene-α-carboxylic acid in the form of a crystalline solid having a melting point of 246° C. to 248° C. The acid so obtained was heated under reflux for 1.5 hours with 50 ml. of piperidine. The resulting solution was evaporated under reduced pressure and the residue was treated with ethanol. The solid was isolated by filtration, washed with ethanol and dried. There was thus obtained 3.3 g. of trans-4-methoxy-4'-nitrostilbene in the form of a crystalline solid having a melting point of 133° C. to 134° C. (Pfeiffer, Berichte, 48, 1793 gives melting point of 133° C. to 134° C. for this compound).

Similarly, trans-4-nitro-4'-methoxystilbene-α-carboxylic acid was prepared in accordance with the first part of the above procedure and was decarboxylated by adding it to a mixture of copper chromite and quinoline at 205° C. to 225° C. in accordance with the procedure of Ulrich et al., supra, to yield cis-4-methoxy-4'-nitrostilbene.

(B) *Trans-4-methoxy-4'-aminostilbene*

The trans-4-methoxy-4'-nitrostilbene obtained as described above was reduced using Raney nickel in accordance with the procedure described in Preparation 4, part B above, to obtain trans-4-methoxy-4'-aminostilbene in the form of a crystalline solid which, after recrystallization from isopropanol, had a melting point of 170° C. to 171° C. (Pfeiffer, supra, gives a melting point of 173° C. to 174° C. for this compound).

Similarly, using the procedure described in Preparation 4, part B above, but replacing trans-2-methoxy-4'-nitrostilbene by cis-4-methoxy-4'-nitrostilbene, there is obtained cis-4-methoxy-4'-aminostilbene.

(C) *Trans-4-methoxy-4'-isocyanatostilbene*

Using the procedure described in Preparation 4, part C, but replacing trans-2-methoxy-4'-aminostilbene by trans-4-methoxy-4'-aminostilbene, there was obtained trans-4-methoxy-4'-isocyanatostilbene in the form of a crystalline solid having a melting point of 163° C. to 166° C.

Similarly, using the procedure described in Preparation 4, part C, but replacing trans-2-methoxy-4'-aminostilbene by cis-4-methoxy-4'-aminostilbene, there is obtained cis-4-methoxy-4'-isocyanatostilbene.

EXAMPLE 1

A total of 4.9 g. (0.0175 mole) of 2,5-dimethoxy-4'-isocyanato-trans-stilbene was added to a refluxing solution of 0.05 g. of triethylenediamine and 5.0 g. of poly(oxy-1,4 - phenyleneisopropylidene - 1,4 - phenyleneoxy - 2 - hydroxytrimethylene) [Bakelite Phenoxy Resin RKHH: average M.W.=28,000] in refluxing tetrahydrofuran. [The amount of isocyanatostilbene employed corresponded to 1 mole per OH group in the resin.] The tetrahydrofuran had been dried previously by adding the required amount of p-toluenesulfonyl isocyanate to reagent grade tetrahydrofuran and then distilling the resulting dry solvent. The reaction mixture was heated under reflux until the infrared spectra of an aliquot no longer showed the presence of a band at 4.43μ corresponding to isocyanate. When this stage in the reaction was reached the reaction mixture was cooled to room temperature (circa 25° C.) and an excess of methanol was added. The solid which separated was isolated by filtration and was purified by dissolving in tetrahydrofuran and reprecipitating by the addition of methanol. The reprecipitation procedure was repeated a number of times. There was thus obtained a yellow resin the molecular structure of which was characterized by the following recurring unit:

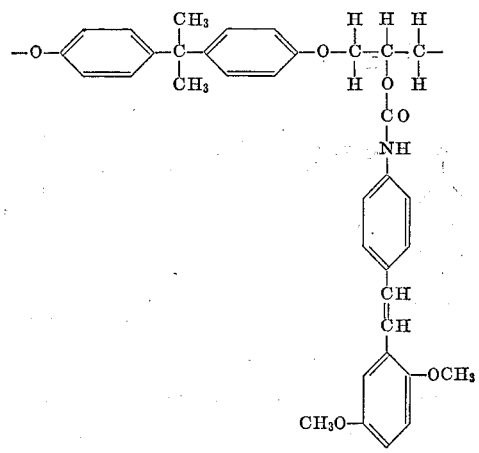

The ultraviolet spectrum of the above resin (in p-dioxane) exhibited maxima at 285, 305, 326, and 348 nm. The stilbene residue in the above moiety is in the trans-position.

Using the above procedure but reducing the amount of isocyanatostilbene from 4.9 g. to 2.45 g. there was obtained the corresponding polymer in which 50 percent of the recurring units in the polymer had the above structure. Similarly, repeating the above procedure but reducing the amount of isocyanotostilbene from 4.9 g. to 1.2 g. there was obtained the corresponding polymer in which 20 percent of the recurring units in the polymer had the above structure.

EXAMPLE 2

Using the procedure described in Example 1 but replacing the phenoxy resin PKHH there used by an equivalent amount (based on OH content) of polyvinylalcohol containing 12 percent acetate, dissolved in formamide

[average M.W.=500,000] there was obtained a light sensitive polymer characterized by the recurring unit of the following structure:

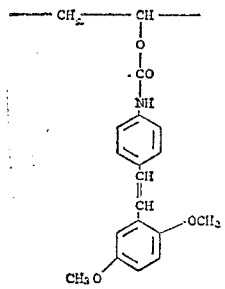

The stilbene residue in the above moiety is in the trans-position.

EXAMPLE 3

Using the procedure described in Example 1, but replacing the phenoxy resin PKHH there used by an equivalent amount (based on OH content) of poly[oxy-3,5-(2-hydroxy-4,7-methanoindene)] [Polycyclo 4200; Union Carbide Corporation; average molecular weight 2,000], there was obtained a light sensitive polymer characterized by the following recurring unit:

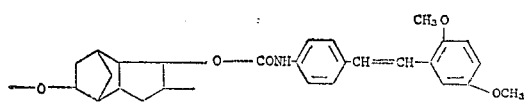

The stilbene residue in the above moiety is in the trans-position.

EXAMPLE 4

Using the procedure described in Example 1, but replacing the phenoxy resin PKHH there used by an equivalent amount (based on OH content) of novolac resin (average M.W.=1,000), there was obtained a light sensitive polymer characterized by the following recurring unit:

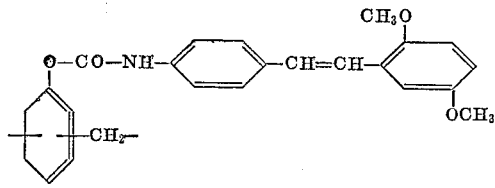

The stilbene residue in the above moiety is in the trans-position.

EXAMPLE 5

Using the procedure described in Example 1, but replacing the trans-2,5-dimethoxy-4'-isocyanatostilbene by cis-2,5-dimethoxy-4'-isocyanatostilbene, there is obtained the corresponding light-sensitive polymer with the recurring unit of the structure shown in Example 1.

Similarly, using the procedure described in Examples 1, 2, 3 or 4, but replacing the trans-2,5-dimethoxy-4'-isocyanatostilbene there employed by an equivalent amount of cis-3,4,5-trimethoxy-4'-isocyanatostilbene,
cis-4-butoxy-4'-isocyanatostilbene,
cis-2-butoxy-3-ethoxy-4'-isocyanatostilbene,
cis-2,3-diethoxy-4'-isocyanatostilbene,
cis-3,4-diisopropoxy-4'-isocyanatostilbene,
cis-3,4-dimethoxy-4'-isocyanatostilbene,
cis-4-ethoxy-2,6-dimethoxy-4'-isocyanatostilbene,
cis-3-ethoxy-2-pentyloxy-4'-isocyanatostilbene,
cis-2-isobutoxy-3-methoxy-4'-isocyanatostilbene,
trans-2-methoxy-4'-isocyanatostilbene,
trans-4-methoxy-4'-isocyanatostilbene,
cis-2,4,6-trimethoxy-4'-isocyanatostilbene, and
cis- and trans-2,5-dimethoxy-3'-isocyanatostilbene, there are obtained the corresponding light sensitive polymers of the invention.

EXAMPLE 6

This example illustrates the use of the photosensitive polymers of the invention as the active components of a typical photoresist system.

A series of negatives were cast on quartz plates as follows:

A 5 percent w./w. solution of the light-sensitive polymer of Example 1 in a mixture of tetrahydrofuran and Cellosolve (20:1 by volume) was cast on a series of quartz plates (2 x 2 x 1/16 inches) to give films of thickness ranging from 0.0001 to 0.00001 inch. (The film on any one plate was substantially uniform in thickness.) The film so obtained was placed at a distance of 30 cm. from the front of a mercury arc lamp (type GE H100 A4/T). A metal plate having a pattern of holes therein was employed as the negative to be reproduced and was mounted between the resist-coated plate and the light source. The resist-coated plate was exposed to light transmitted via the negative for a period of 2 to 5 minutes depending on the thickness of the film. At the end of this time the image on the resist-coated plate was developed by washing with a mixture of xylene, Cellosolve, and tetrahydrofuran (20:10:5) and the plate was found to have deposited thereon a solvent insoluble polymer in a pattern corresponding to that of the transmitting holes in the negative. The polymer coating so produced was found to be resistant to acid and weak alkali solutions and to abrasive forces.

The above experiment was repeated using a film of photo-resist deposited on a thin copper plate. After formation of the insoluble polymer image on the plate, the latter was exposed to 38 percent ferric chloride solution. The surface of the copper plate etched readily but the polymer image was unaffected.

What is claimed is:

1. A light sensitive polyvinyl alcohol wherein from about 10 percent to about 100 percent of the recurring units in the chain thereof are moieties of the formula:

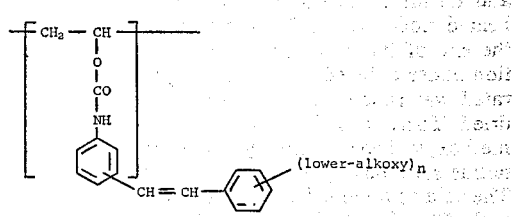

wherein $n$ is an integer from 1 to 3, and from 90 to 0 percent of the recurring units in the chain of said polymer are moieties of the formula:

2. A light sensitive phenoxy resin wherein from about 10 percent to about 100 percent of the recurring units in the chain thereof are moieties of the formula:

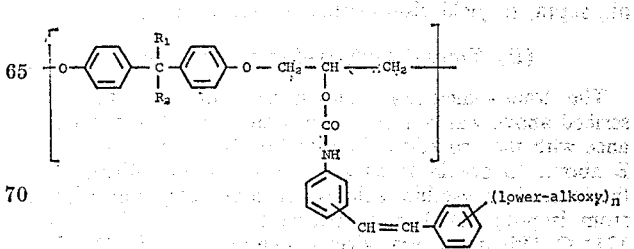

wherein $n$ is an integer from 1 to 3, and $R_1$ and $R_2$ are lower-alkyl, and from 90 to 0 percent of the recurring units in the chain of said polymer are moieties of the formula:

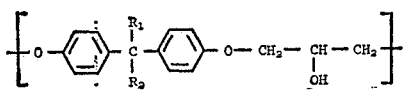

3. A light-sensitive polyvinyl alcohol according to claim 1 wherein the

moiety is

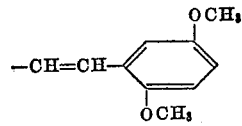

and said moiety is in the para position with respect to NH in the benzene ring to which it is attached.

4. A light-sensitive phenoxy resin according to claim 2 wherein the

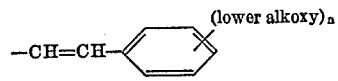

moiety is

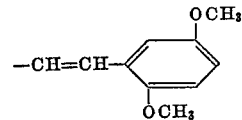

and said moiety is in the para position with respect to NH in the benzene ring to which it is attached.

5. A light sensitive poly(hydroxydicyclopentadiene) ether wherein from about 10 percent to about 100 percent of the recurring units in the chain thereof are moieties of the formula:

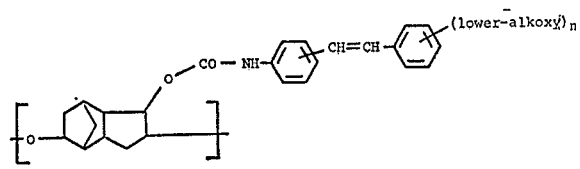

wherein $n$ is an integer from 1 to 3, and from 90 to 0 percent of the recurring units in the chain of said polymer are moieties of the formula:

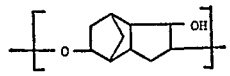

6. A light sensitive poly(hydroxydicyclopentadiene) ether according to claim 5 wherein the

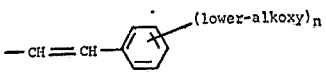

moiety is

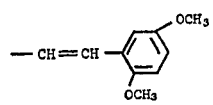

and said moiety is in the para position with respect to NH in the benzene ring to which it is attached.

7. A light sensitive novolac resin wherein from about 10 percent to about 100 percent of the recurring units in the chain thereof are moieties of the formula:

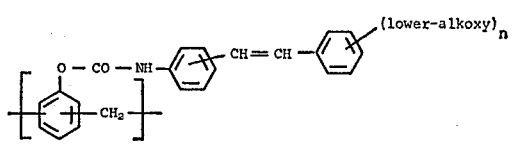

wherein $n$ is an integer from 1 to 3, and from 90 to 0 percent of the recurring units in the chain of said polymer are moieties of the formula:

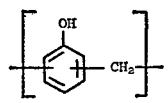

8. A light sensitive novolac resin according to claim 7 wherein the

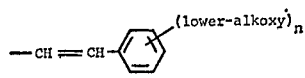

moiety is

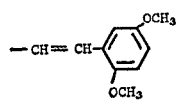

and said moiety is in the para position with respect to NH in the benzene ring to which it is attached.

References Cited
UNITED STATES PATENTS

| | | | |
|---|---|---|---|
| 3,471,425 | 10/1969 | Ehring et al. | 260—22 |
| 3,480,591 | 11/1969 | Oertel et al. | 260—75 |

WILLIAM SHORT, Primary Examiner

L. L. LEE, Assistant Examiner

U.S. Cl. X.R.

96—115 R; 260—30.4 N, 30.6 R, 30.8 DS, 32.4 33.2 R, 33.6 UB, 33.8 UB, 52, 77.5 AP, 453 AR